US012750675B2

(12) United States Patent
Rodgers et al.

(10) Patent No.: US 12,750,675 B2
(45) Date of Patent: Sep. 29, 2026

(54) SYSTEMS AND METHODS FOR CUSTOMIZABLE USER EXPERIENCE WITH SHAREABLE DEVICES

(71) Applicant: Universal City Studios LLC, Universal City, CA (US)

(72) Inventors: Rachel E. Rodgers, Orlando, FL (US); Wei C. Yeh, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 454 days.

(21) Appl. No.: 17/821,370

(22) Filed: Aug. 22, 2022

(65) Prior Publication Data

US 2024/0064521 A1 Feb. 22, 2024

(51) Int. Cl.

*H04W 12/55* (2021.01)
*H04L 67/1097* (2022.01)
*H04L 67/306* (2022.01)

(52) U.S. Cl.

CPC ......... *H04W 12/55* (2021.01); *H04L 67/1097* (2013.01); *H04L 67/306* (2013.01)

(58) Field of Classification Search

CPC ... H04W 12/55; H04L 67/1097; H04L 67/306
See application file for complete search history.

(56) References Cited

U.S. PATENT DOCUMENTS

| | | | | |
|---|---|---|---|---|
| 8,248,367 | B1 | 8/2012 | Barney et al. | |
| 10,373,383 | B1 * | 8/2019 | Werner | G06Q 10/087 |
| 10,583,357 | B2 | 3/2020 | Barney et al. | |
| 11,103,773 | B2 | 8/2021 | Rathod | |
| 2012/0115446 | A1 * | 5/2012 | Gautama | H04W 4/44 455/414.1 |
| 2012/0172060 | A1 * | 7/2012 | Qing | H04M 1/72412 455/456.6 |
| 2015/0045988 | A1 * | 2/2015 | Gusikhin | G07C 9/00571 701/2 |
| 2015/0332258 | A1 * | 11/2015 | Kurabi | G06Q 20/4015 705/71 |
| 2017/0097243 | A1 | 4/2017 | Ricci | |
| 2020/0186590 | A1 | 6/2020 | Penilla et al. | |
| 2021/0203747 | A1 * | 7/2021 | Gorsica, IV | H04L 67/143 |
| 2026/0095964 | A1 * | 4/2026 | Du | H04W 76/14 |

OTHER PUBLICATIONS

PCT/US2023/030724 International Search Report and Written Opinion mailed Nov. 23, 2023.

* cited by examiner

*Primary Examiner* — Harris C Wang
(74) *Attorney, Agent, or Firm* — Fletcher Yoder, P.C.

(57) ABSTRACT

An interactive system includes a server coupled to one or more databases storing a user profile. The interactive system also includes a shareable device including one or more processors, one or more memory storing a shareable device identifier (ID), one or more feedback devices, and ultra-wideband (UWB) circuitry. The shareable device is communicatively coupled to the server, and the one or more processors are configured to receive a user ID (e.g., a string and/or numeric code associated with a user's profile and transmitted by a user device) via the UWB circuitry, transmit the user ID to the server, transmit the shareable device ID to the server subsequent to receiving the user ID, receive a pairing indication from the server subsequent to transmitting the user ID to the server, and generate a control signal that causes the one or more feedback devices to activate based on the pairing indication.

17 Claims, 6 Drawing Sheets

SYSTEMS AND METHODS FOR CUSTOMIZABLE USER EXPERIENCE WITH SHAREABLE DEVICES

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks often include interactive areas, including rides and attractions. Some interactive areas may include features that provide the same user experience for every user. However, providing different or unique features that may be tailored for each user may enhance and provide better user experiences for each user. It is now recognized that it is desirable to provide different or unique features in interactive areas of amusement parks that provide different or unique user experiences for each user based on, for example, user input.

BRIEF DESCRIPTION

Certain embodiments commensurate in scope with the originally claimed subject matter are discussed below. These embodiments are not intended to limit the scope of the disclosure. Indeed, the present disclosure may encompass a variety of forms that may be similar to or different from the embodiments set forth below.

In one embodiment, an interactive system includes a server coupled to one or more databases storing a user profile. The interactive system includes a shareable device having one or more processors, one or more memory devices storing a shareable device identifier, one or more feedback devices, and communication circuitry. The shareable device is communicatively coupled to the server. The one or more processors receive a user identifier from a user device via the communication circuitry. The one or more processors also transmit the user identifier to the server via the communication circuitry. Further, the one or more processors transmit the shareable device identifier to the server via the communication circuitry. Even further, the one or more processors receive a pairing indication from the server via the communication circuitry based on the user identifier and the shareable device identifier. Further still, the one or more processors activate the one or more feedback devices based on the pairing indication.

In one embodiment, a method includes receiving, using communication circuitry, a user identifier (ID) associated with a user device from a shareable device. The method also includes receiving, using the communication circuitry, a shareable device ID from the shareable device. Further, the method includes determining, using the one or more processors, a user profile to pair with the shareable device based on the user ID. Even further, the method includes pairing, using the one or more processors, the user profile with the shareable device based on the shareable ID.

In one embodiment, an interactive system includes a plurality of shareable devices. Each shareable device of the plurality of shareable devices stores a respective shareable device identifier (ID). The interactive system also includes a server coupled to one or more databases storing a plurality of user profiles. The server includes communication circuitry that communicates with the plurality of shareable devices. The server also includes one or more processors that receive a user identifier from a first shareable device of the plurality of shareable devices via the communication circuitry. The one or more processors also receive a first shareable device identifier from the first shareable device via the communication circuitry. Further, the one or more processors determine that a first user profile of the plurality of user profiles is paired with a second shareable device of the plurality of shareable devices. Further still, the one or more processors pair a second user profile of the plurality of user profiles with the first shareable device based on the first user profile being paired with the second shareable device.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
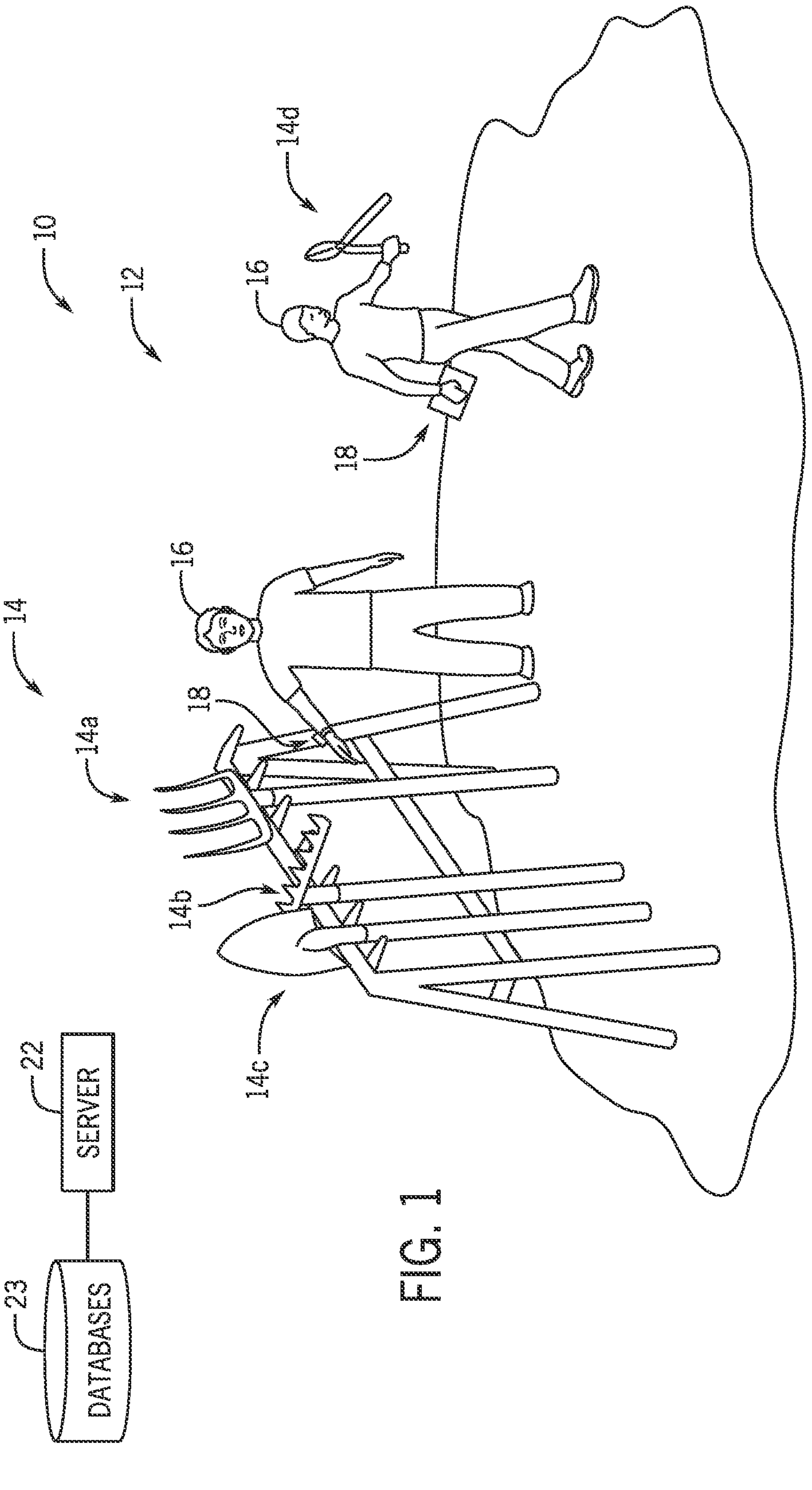
FIG. 1 is schematic diagram of a shareable device system for providing customizable user experiences, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates to a shareable device system that provides access of shareable devices to users (e.g., guests, patrons, visitors, customers, and so on) based on a user identifier communicated by a user device (e.g., a wearable device, a smart phone, a tablet, a laptop) associated with one or more of the users. Using the user identifier provided by the user device, the shareable device may pair to a user profile stored on a server that is associated with the user device. The shareable device may include a device that a user may temporarily use (e.g., access and subsequently return to an organization enabling use of the shareable device (e.g., an amusement park, a rental organization, such as a car rental organization, a hardware organization, and so on), whether to enhance the user's experience at the amusement park or for transportation. For example, in an embodiment, the shareable device system may be implemented in amusement parks (e.g., amusement park rides, performance shows, and games) to provide the user with temporary access to a shareable device that the user may use to interact with the amusement park. In another embodiment, the shareable device system may be implemented in non-amusement park settings, such as vehicle rental enterprises (e.g., vehicle rental environments for cars, bicycles, scooters, boats, jet skis, and the like), power tool rental enterprises, audio/video (A/V) equipment rental enterprises, or other electronic device rental enterprises.

In an embodiment where the shareable device is implemented in an amusement park, the shareable device may be any of a variety of types of devices that are configured to be carried, held, and/or worn by the users. For example, the shareable device may include targeting devices (e.g., blasters), wands, toys, figurines, clothing, jewelry, bracelets, headgear (e.g., enabling virtual or augmented reality experiences), medallions, glasses, and/or any combination thereof (e.g., targeting devices integrated into bracelets). In an embodiment, the shareable device may be configured to be used by multiple different users over time. For example, a user may pick up a shareable device at an entrance to the interactive environment, use the shareable device to participate in the interactive environment as the user proceeds through the interactive environment, and then return the shareable device as the user exits the interactive environment. The shareable device may be made available again at the entrance to the interactive environment (e.g., after cleaning), and then another user may pick up the shareable device at the entrance to the interactive environment and use the shareable device to participate in the interactive environment, and so on.

In an embodiment where the shareable device is implemented in a non-amusement park, the shareable device may be a vehicle, such as a car, truck, motorcycle, bike, airplane, boat, jet ski, canoe, kayak, and so on. In a general similar manner as described with respect to amusement park, the shareable device may be configured to be used by multiple different users over time. For example, in an embodiment where the shareable device is a vehicle, a user may obtain the vehicle at a vehicle rental environment, and use the vehicle during a predetermined time period, and then return the vehicle at the end of the time period. The vehicle may be made available again at the vehicle rental environment (e.g., after cleaning, maintenance, repairs, and so on), and then another user may obtain the vehicle at the entrance to the interactive environment and use the vehicle for transportation, and so on.

In any case, to provide a more desirable user experience (e.g., a more immersive experience or user-friendly experience), it may be advantageous to pair, link, or register a shareable device with a user profile associated with the user. In general, the user profile may enable interactions between the user and the shareable device to be tracked and/or recorded, for certain gamification purposes as described herein. It is presently recognized that a user profile may be stored as data (e.g., as a relatively large amount of data) to adjust settings of or personalize the shareable device and/or communicate updates indicative of the use of the shareable device by the user. However, in certain instances, communication between the user device and the shareable device may be impeded in an environment that includes multiple shareable devices and/or multiple users. For example, the user device may be used in areas with limited available bandwidth and/or in an environment with interference sources (e.g., additional user devices, other electronic devices, and physical obstructions, lack of cell towers, and the like). As such, communicating a relatively large amount of data in such environments may be difficult, and may prevent the user from accessing the shareable device and/or break immersion of the user attempting to use the shareable device within an interaction environment.

Accordingly, provided herein is a shareable device system including one or more shareable devices that are communicatively coupled to a server. As discussed herein, the shareable device system provides techniques for pairing, registering, or otherwise linking to a user profile (e.g., a guest profile) based on a user identifier (e.g., user ID) transmitted by the user device and a user profile associated with the user that is stored on a server associated with and/or distinct from the user device. In general, the one or more shareable devices may communicate with the user device via a first type of communication (e.g., ultra-wideband (UWB) communication), while the one or more shareable devices communicate with the server via a second type of communication (e.g., Wi-Fi, Ethernet). In general, the first type of communication may enable transmitting over a relatively shorter range (e.g., one centimeter or less, one meter or less, two meters or less, three meters less, five meters or less, and so on). Furthermore, the one or more shareable devices may communicate with the server via a second type of communication (e.g., Wi-Fi, Ethernet, and/or cellular connection). In general, the second type of communication (i.e., for communicating between the server and the user device) may enable transmitting over a relatively larger range (e.g., three meters or more, five meters or more, ten meters or more, 20 meters or more, 50 meters or more, and so on) as compared to the first type of communication. It is presently recognized that it may be desirable to pair a relatively larger amount of data (e.g., a user profile) to a shareable device by using a relatively smaller amount of data (e.g., a user identifier) transmitted by a user device to access the relatively larger amount of data stored on a server. For example, it may be advantageous for a user to have direct access to data associated with the user's profile (e.g., the user identifier) via the user device as compared to the user having to access a separate device to search for and access their user profile. Moreover, a shareable device may be paired to a user profile associated with a user by the shareable device acting as an intermediate between two types of communication protocols (e.g., between the user device and the shareable device and between the shareable device and the server).

Furthermore, in instances where communication between the shareable device and the user device is limited, a likelihood of successful pairing between the user profile and the shareable device may increase because the user device may provide a relatively small amount of data as compared to the user profile. For example, the shareable devices may generally receive a user identifier (e.g., a user ID), such as a string and/or numeric code associated with a user's profile from the user device, and transmit the user identifier and shareable device identity information that identifies the shareable device to the server. In turn, the server pairs, registers, or links a user profile (e.g., via the user identifier) to the shareable device associated with the shareable device shareable device identifier (e.g., shareable device ID). In general, the shareable device ID may be a string and/or numeric code associated with a particular shareable device. Furthermore, when the user interacts with the shareable device, data indicative of the interactions are transmitted from the shareable device to the server and the user's interactions may be tracked and recorded on a storage component accessible by the server. In this way, a user in an interactive environment and/or vehicle rental environment may receive a higher quality and uninterrupted personalized experience in locations that may have an increased likelihood for connection interruptions.

With the foregoing in mind, FIG. 1 shows a perspective view of an interactive environment 10 with a shareable device system 12 having one or more shareable devices 14A-D (collectively 14). As shown, the interactive environment 10 includes a user 16 holding a user device 18. While only two users 16 and two user devices 18 are shown, another embodiment of the shareable device system 12 may include any number (e.g., one or more, two or more, three or more, four or more, five or more, and so on) of user devices 18 with any number (e.g., one or more, two or more, three or more, four or more, five or more, and so on) of users 16. In general, the user device 18 is an electronic device having a processor and communication circuitry that communicates with the shareable devices 14 via wireless communication. For example, the user device 18 may identify the one or more shareable devices 14 and transmit data to the one or more shareable devices using ultra-wideband (UWB) communication (e.g., at a frequency between 3.1 gigahertz (GHz) to 10.6 GHz), radio frequency identification (RFID) beacons and/or tags (e.g., at approximate frequencies of 433 megahertz (MHz) or 860-960 MHz), or Wi-Fi (e.g., at approximate frequencies of 2.4 GUI/or 5 GHz).

In general operation, a user 16 may bring a user device 18 into proximity of a shareable device 14 (e.g., within UWB range, such as within three centimeters (cm) or less, four cm or less, five cm or less, ten cm or less, and so on) to establish communication between the user device 18 and the shareable device 14. Then, the user device 18 may provide the user identifier to the shareable device 14. The shareable device 14 may relay the user identifier to a server 22 and the shareable device 14 may transmit a shareable device identifier associated with the shareable device 14 to the server 22. In general, the server may be any suitable computing device, including a desktop computer, a laptop, a mobile device, a smart phone, a wearable device, and the like. The user identifier is associated with a user profile in the one or more databases 23. In general, the shareable device identifier identifies the particular shareable device 14 that the user is attempting to access, and thus enables pairing between the user profile associated with the user 16 and the particular shareable device 14. Once the shareable device 14 and the user profile are paired, interactions between the user and the shareable device 14 within the interactive environment 10 may be tracked and/or recorded, such as updating data stored in the databases 23 to include a record of the interactions with the shareable device 14, awarding points to the user based on using the shareable device 14, tracking progress of the user when using the shareable device 14, tracking achievements of the user when using the shareable device 14, and the like.

In an embodiment, the server 22 pairing the shareable device 14 with the user profile may include providing certain user profile settings to the shareable device 14 that causes the shareable device 14 to provide a pairing indication to notify the user that the shareable device 14 has been paired to the user. That is, the pairing indication may cause one or more feedback devices 29 (e.g., visual feedback devices (e.g., light-emitting elements such as diodes, a display screen), audio feedback devices (e.g., speakers), haptic elements, and the like) of the shareable device 14 to activate based on the pairing indication. For example, the user profile may include certain user preferences (e.g., graphics, images, and other visuals, audio, and haptics patterns that the user has previously selected) that are used by the shareable device 14 to provide feedback via the one or more feedback devise 29, which may provide improved immersion of the user with an interactive environment. For example, the user may prefer that the shareable device 14 present a particular color scheme (e.g., blue), and a light emitter(s) (representative of the feedback device 29) on the shareable device 14 may illuminate in a color (e.g., blue) that corresponds to the color scheme upon successful pairing. It should be appreciated that the server 22 may provide the pairing indication that includes the user profile and/or instructions to control the feedback device 29 in a particular way (e.g., to turn on the light emitter(s) representative of the feedback device 29 with the color) to cause the shareable device 14 to provide an indication of successful pairing (or unsuccessful pairing).

Figure 2:
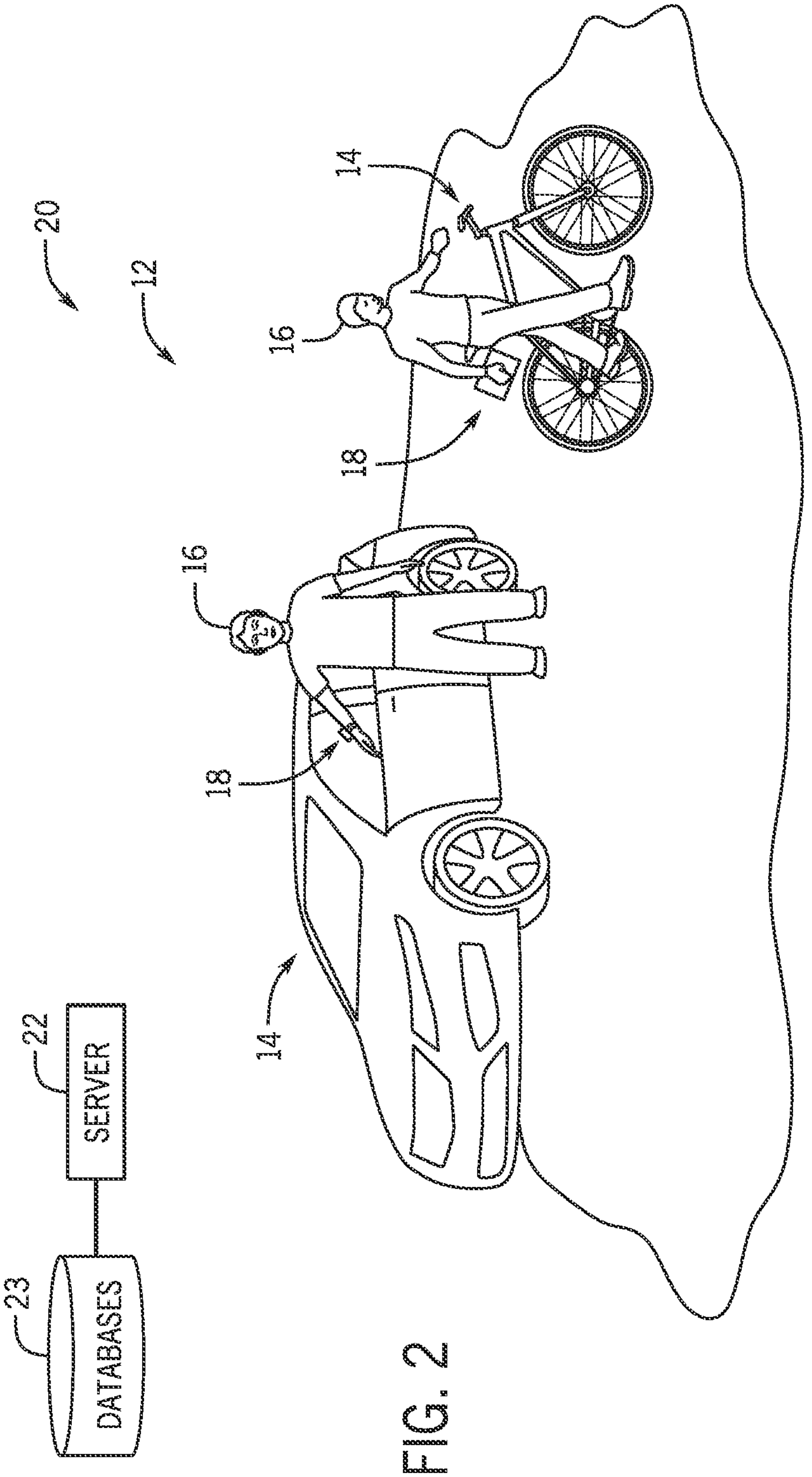
FIG. 2 is a schematic diagram of a shareable device system for providing access to vehicles, in accordance with an aspect of the present disclosure.
Figure 3:
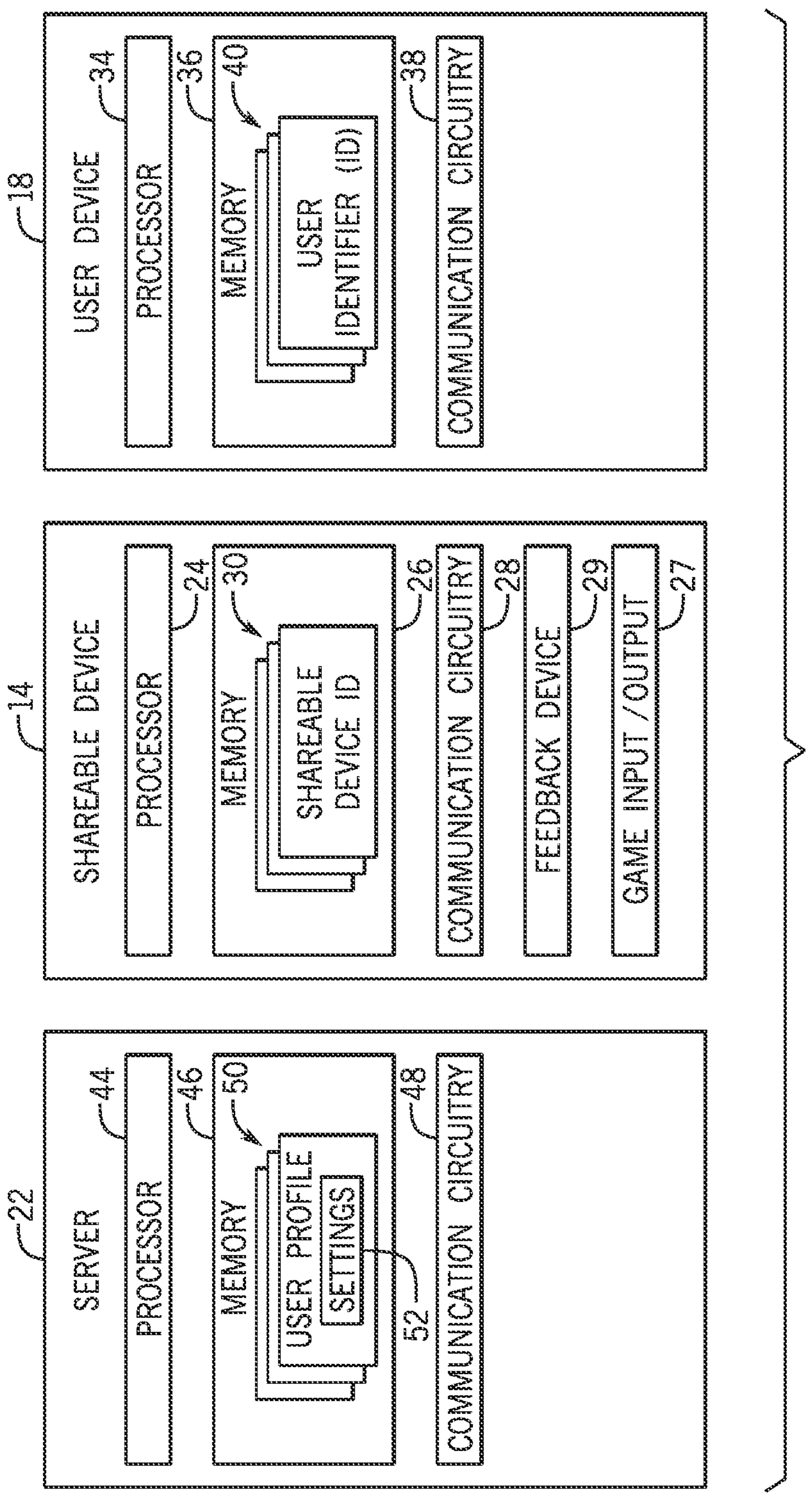
FIG. 3 is a block diagram illustrating a shareable device system, in accordance with an aspect of the present disclosure.

As mentioned above, the shareable device system 12 may also be implemented in a vehicle rental environment. To illustrate this, FIG. 2 shows a perspective view of a vehicle rental environment 20 with the shareable device system 12. In general operation, and in a generally similar manner as described with respect to FIG. 1, the users 16 may bring the user devices 18 into proximity (e.g., within UWB range) of the shareable device 14 (e.g., a vehicle) to establish communication between the user device 18 and the shareable device 14. Then, the user device 18 may provide the user identifier to the shareable device 14, which may then relay the user identifier and a shareable device ID to the server 22. The user identifier may enable identification of the user profile in the one or more databases 23. The shareable device ID may enable interactions between the user and the vehicle (i.e., the shareable device 14) to be tracked, such as updating data stored in the databases 23 to include a record of the interactions, such as miles driven, driving habits, locations visited, and the like. The server 22 may pair the shareable device 14 with the user profile and, in turn, the server 22 may provide a pairing indication to notify the user that the shareable device 14 has been paired to the user profile 50, as shown in FIG. 3. For example, the pairing indication may cause a feedback device 29 of the shareable device 14 to provide feedback that the user profile 50 and the shareable device 14 are paired. For example, in an embodiment where the shareable device system 12 is implemented in a vehicle rental environment 20, the received pairing indication 71 by the shareable device 14 (e.g., a vehicle) and/or the user device 18 may cause an adjustment of features of the car (e.g., a seat position or orientation, a mirror position, a volume of speakers, a preselected radio list, a connection to the user device 18 (e.g., via BlueTooth®), an air conditioning setting, a heater setting, a seat heating setting, a seat cooling setting, and the like) and/or other features that may provide a more personalized experience for the user (e.g., cause a display screen of the vehicle to display a "welcome back" message). Accordingly, a vehicle rental experience may be more convenient, comfortable, or pleasing to a user, and decrease a likelihood of a user's settings not being applied to the shareable device 14 due to connection interruptions between the user device 18 and the shareable device 14.

To perform the operations described herein, the shareable devices 14, the server 22, and the user device 18 may each include certain processing circuitry, memory circuitry, and communication circuitry. To illustrate this, FIG. 3 is a block diagram of a shareable device system 12 including one or more shareable devices 14, a server 22, and a user device 18. In an embodiment, the one or more shareable devices 14 may each include a processor 24, a memory 26, and communication circuitry 28 to enable the one or more shareable devices 14 to communicate with the user device 18 and/or the server 22. The various functional blocks shown in FIG. 1 may include hardware elements (including circuitry), software elements (including machine-executable instructions) or a combination of both hardware and software elements (which may be referred to as logic). The processor 24, memory 26 and/or nonvolatile storage, the communication circuitry 28, and/or the feedback device 29 may each be communicatively coupled directly or indirectly (e.g., through or via another component, a communication bus, a network) to one another to transmit and/or receive data between one another. It should be noted that FIG. 3 is merely one example of a particular implementation and is intended to illustrate the types of components that may be present in the shareable device 14, the user device 18, and/or the server 22. The shareable device 14 also includes a game input/output control element 27, which may include an input trigger, button, joystick, control pad, or other selectable features, and/or similar features as the feedback device 29 (e.g., speaker, display, light-emitting device, haptic device, and so on). The game input/output 27 may provide a trigger condition to the server 22 that causes the server 22 to track the position and/or orientation of the shareable device 14, which may facilitate certain game elements within an interactive environment 10. In general, the trigger condition may indicate interactions between the user and the shareable device 14. For example, the trigger condition may indicate whether a user is pulling the trigger of a shareable device 14 (i.e., in an embodiment where the shareable device 14 is a blaster). As another non-limiting example, the trigger condition may indicate a direction of movement or a particular motion of the shareable device 14 (e.g., a user waving a wand). As another non-limiting example, the trigger condition may indicate that the user is pressing a particular button of the game input/output 27. In this way, the trigger condition may be utilized by the server 22 to enable tracking of the shareable device 14.

The communication circuitry 28 may include, for example, one or more communication circuitry 28 for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the communication circuitry 28 may include one or more communication circuitry for using a cellular communication standard of the 5G specifications that include the millimeter wave (mmWave) frequency range (e.g., 24.25-300 gigahertz (GHz)) that defines and/or enables frequency ranges used for wireless communication. In some embodiments, the communication circuitry 28 may include a transmitter and/or receiver that support transmission and receipt of various wireless signals via one or more antennas. For example, the communication circuitry 28 may include multiple transmitters, multiple receivers, multiple transceivers, and/or multiple antennas as suitable for various communication standards.

Additionally, the user device 18 may include a processor 34, a memory 36, and communication circuitry 38 to enable the user device 18 to communicate with the one or more shareable devices 14. In an embodiment, the user device 18 may scan (e.g., periodically or based on certain trigger conditions, such as activation of the user device 18, a power level of the user device 18, and so on) for and/or request the user identifier from the user device 18. For example, the shareable device 14 may use the communication circuitry 28 to scan for the user ID from the user device 18; however, the shareable device 14 may use any suitable ultra-wideband (UWB) techniques to scan for a UWB tag (that stores or is indicative of the user identifier) of the user device 18. For example, the UWB tag may include an antenna that transmits and receives signals, a microprocessor, and a memory storing information (e.g., a unique identification code). As such, if the UWB tag communicates with an additional UWB tag, the UWB tag may backscatter data indicative of the information stored in the memory of the UWB tag. Other types of communication are envisioned, such as near field communication (NFC) devices, radio frequency (RF) communication devices, Wi-Fi, Bluetooth, or any other suitable wireless communication. Additionally, the memory 36 of the user device 18 may store identification (ID) information 40 that may be used by the server 22 to identify one or more user profiles. In some embodiments, the user device 18 may store and/or execute an application in the memory 36 to be executed by the processor 34 that facilitates communication with the shareable device 14 and/or the server 22. The communication circuitry 38 and 48 may include generally similar features as described above with respect to the communication circuitry 28.

In an embodiment, the communication circuitry 28 of the shareable device 14 may include multiple types of communication circuitry 28. For example, the communication circuitry 28 may include a first type of communication circuitry that is capable of communicating with the user device 18 via a first communication protocol and a second type of communication circuitry that is capable of communicating with the server 22 via a second communication protocol. As such, the communication circuitry 28 of the shareable device 14 may receive the user ID 40 from the user device 18 via the first communication protocol (e.g., communicative via a first range of frequencies). Furthermore, the communication circuitry 28 of the shareable device 14 may transmit the user ID 40 to the server 22 via the second communication protocol (i.e., communicative via a second range of frequencies), and the server 22 pairs the user profile 50 associated with the user ID 40 to the shareable device 14. In this way, by transmitting the user ID 40 to the shareable device 14 and utilizing the second communication protocol for transmitting the information (i.e., the user ID 40 and the shareable device ID 30) to pair the user device 18 to the shareable device 14, pairing may not be delayed in instances when communication using the first communication protocol is impeded (e.g., due to other user devices 18 that are also communicating via the first communication protocol). In particular, the user device 18 may transmit a relatively small amount of data (i.e., the user ID) to the shareable device 14.

In an embodiment, the one or more shareable devices 14 may scan (e.g., periodically or based on certain trigger conditions, such as activation of the shareable device 14, a power level of the shareable device 14, and so on) for and/or request the user ID 40 from the user device 18. For example, the shareable device 14 may use the communication circuitry 28 to scan for the user ID from the user device 18; however, the shareable device 14 may use any suitable ultra-wideband (UWB) techniques to scan for a UWB tag (that stores or is indicative of the user ID 40) in the user device 18. Other types of communication are envisioned, such as Bluetooth, WiFi, or the like. Additionally, the memory 26 of the one or more shareable devices 14 may store a shareable device identifier (e.g., shareable device ID) 30 that identifies the shareable device 14, such that interactions between a user 16 and a particular shareable device 14 within an interactive environment 10 and/or the vehicle rental environment 20 may be accurately tracked and recorded. Additionally, the shareable device 14 may include one or more feedback devices 29, such as visual feedback device (e.g., light-emitting elements such as diodes, a display screen), audio feedback devices (e.g., speakers), haptics, and the like. The discussion above generally relates to the shareable device 14 pulling (e.g., via scanning) for the user ID. In some embodiments, the user device 18 may transmit (e.g., periodically or based on certain trigger conditions, such as activation of the user device 18, a power level of the user device 18, and so on). In this way, the user device 18 may push the user ID 40 to the shareable device 14. It should be noted that other suitable techniques for pushing or pulling identification information between devices.

Further still, the server 22 may include a processor 44, a memory 46, and communication circuitry 48 to enable the server 22 to communicate with the one or more shareable devices 14. In an embodiment, the server 22 may scan (e.g., periodically or based on certain trigger conditions, such as activation of the user device 18, a power level of the user device 18, and so on) for and/or request the user ID and the shareable device ID from the shareable devices 14. For example, the server 22 may use the communication circuitry 48 to scan for the user ID and the shareable device ID from the shareable devices 14. In some embodiments, the communication circuitry 48 may use any suitable type of communication, such as Bluetooth, Wi-Fi, or the like. Additionally, the memory 46 of the server 22 (e.g., or a database accessible by the server 22) may store a user profile 50 that may be used to adjust operation of the shareable devices 14 and facilitate tracking of the user's interactions with the shareable device 14.

With reference to FIGS. 1, 2, and 3, in operation, the user may enter or otherwise be within an area associated with the interactive environment 10 or vehicle rental environment 20 by passing through an entrance of, standing within, or walking around the interactive environment 10 or the vehicle rental environment 20. In an embodiment, the user may obtain (e.g., select) the shareable device 14 as the user is within the interactive environment 10. Thus, in some embodiments, the shareable device 14 may not be pre-registered or otherwise linked to the user profile 50 of the user prior to the user entering or being otherwise within the interactive environment 10. Instead, the shareable device 14 may be temporarily paired, registered, and linked to the user profile 50 of the user as the user is within the interactive environment 10 and/or while the user obtains the shareable device 14 to participate in the interactive environment 10. However, it should be noted that, at least in some embodiments, the shareable device 14 may be pre-registered to the user profile 50 of the user.

The shareable device 14 may be temporarily paired, registered, or linked to the user profile 50 through any of a variety of linking techniques. In an embodiment, the shareable device is paired to the user profile 50 through communication with a user device 18 that of the user and that outputs a user ID 40 associated with the user. As described herein, the user device 18 may include a mobile phone, wearable device (e.g., a bracelet), or any other suitable device. For example, the user device 18 may include a device that the user also uses outside of the interactive environment 10 for personal tasks that are unrelated to the interactive environment 10 (e.g., the mobile phone that the user uses to complete personal phone calls), or the user device 18 may include a device that the user purchases (or receives in exchange for an admission fee) specifically for use in the interactive environment 10 and/or in the amusement park that has the interactive environment 10.

In an embodiment, once the shareable device 14 receives the user ID 40 from the user device 18, the shareable device 14 may then transmit the user ID 40 along with its own shareable device ID 30 to the server 22. This enables the server 22 to pair the shareable device 14 with the user profile 50 (e.g., temporarily, such as while the user travels through the interactive environment 10 and/or uses the shareable device 14 during a predetermined time period corresponding to a vehicle rental time period). In alternative embodiments, the user profile 50 (e.g., some or all settings associated with the user profile 50) may be communicated to and/or stored on the shareable device 14 (e.g., temporarily, such as while the user travels through the interactive environment 10). For example, in an embodiment, the shareable device 14 may be an interactive tool (e.g., a blaster that shoots virtual projectiles) used in the interactive environment 10. As such, if the user profile 50 includes a preference for a virtual projectile, the preference may be communicated to and/or stored on the shareable device 14. Accordingly, the shareable device 14 may emit or output the virtual projectiles in accordance with the preference of the user profile 50. As another example, if the user profile establishes a color scheme for the user, the color scheme may be communicated to and/or stored on the shareable device 14. Accordingly, the shareable device 14 may display the color scheme in accordance with the preference of the user profile 50. It should be appreciated that the shareable device 14, the server 22, the one or more databases 23, and/or the user device 18 may communicate via any suitable communication techniques to perform the various embodiments disclosed herein, such as to exchange identifier(s), pair the shareable device 14 to the user profile 50, and/or to provide the user profile 50 to the shareable device 14. For example, the user device 18 may retrieve the user profile 50 from the one or more databases 23 and communicate the user profile 50 to the shareable device 14. As another example, the user device 18 may receive the shareable device ID 30 from the shareable device 14, and then provide the user ID 40 and the shareable device ID 30 to the server 22.

Figure 5:
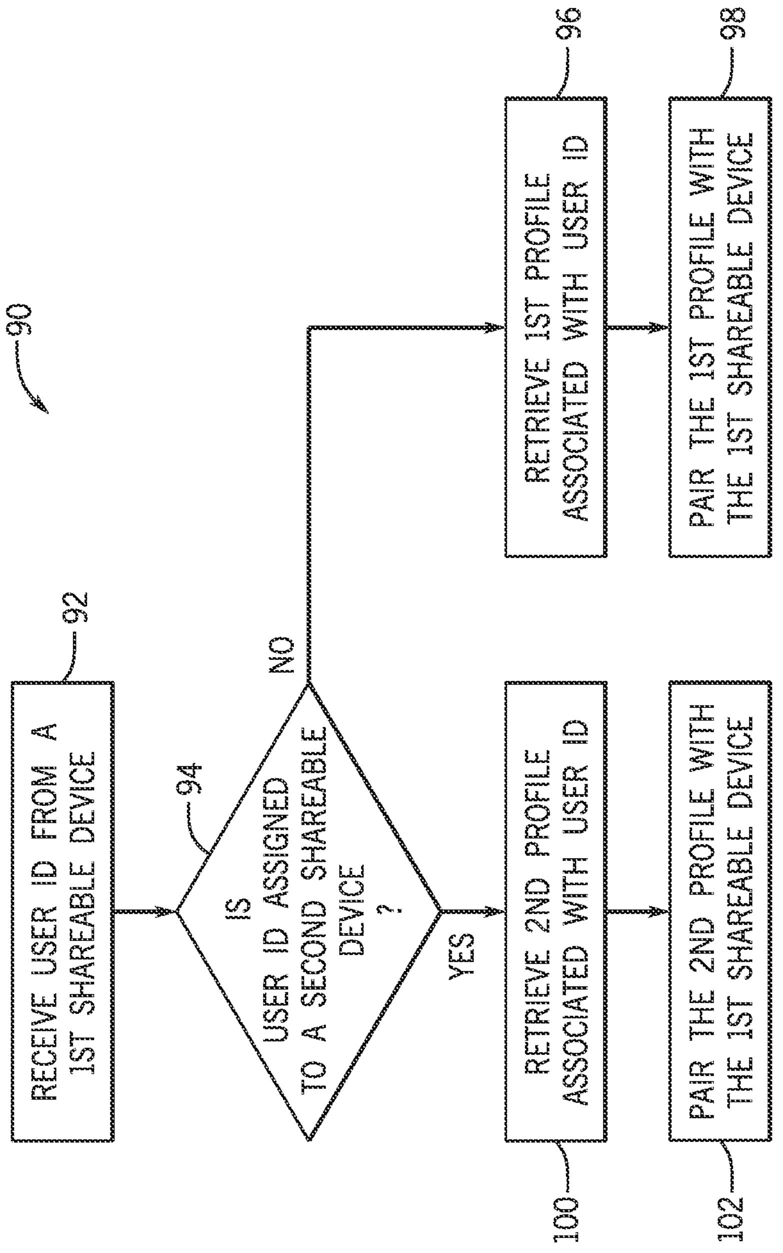
FIG. 5 is a flow diagram of a method for pairing a shareable device with a user profile corresponding to a user device, in accordance with an aspect of the present disclosure.

In an embodiment, the server 22 may perform an iterative process to pair the shareable device 14 to the user profile 50, as described in more detail with respect to FIG. 5. In particular, prior to or upon entering the interactive environment 10, the user may open and interact with an application (e.g., software application) on the user device 18 associated with the interactive environment 10. Through the interaction with the application on the user device 18, the user may create and/or modify features of the user profile 50 of the user. For example, continuing with the example above where the shareable device 14 is a blaster for the interactive environment 10, the user may create the user profile 50 with a preference for a type of virtual projectile (e.g., water, goo, ball, animal, character), a mode (e.g., ice, fire, water), a color scheme (e.g., purple, green, blue), or the like. Furthermore, through the interaction with the application on the user device 18, the user may create and/or modify features of an additional user profile for an additional user (e.g., a child of the user, a companion of the user, a guest of the user) or for the user (e.g., if the user would like to have the ability to select from multiple, different user profiles 50). Indeed, the user may create and/or modify features of any number of user profiles 50 (e.g., one or more, two or more, three or more, four or more, five or more, and so on), and the user profiles 50 may be stored in the one or more databases 23.

In an embodiment, the shareable device ID 30 and/or the user ID 40 may be transmitted using audio data. For example, the communication circuitry 28 of the shareable device 14 and/or communication circuitry 38 of the user device 18 may be capable to transmitting the user ID 40 and/or the shareable device ID 30 as ultrasonic data (e.g., at a frequency greater than 20,000 Hertz (Hz)). Accordingly, the server 22 may include suitable communication circuitry 48 for receiving ultrasonic data indicating the shareable device ID 30 and/or the user ID 40. Although the discussion above relates to ultrasonic data, it should be noted that the shareable device ID 30 and/or the user ID 40 may also be transmitted as audio data at a frequency corresponding to what a human is capable of hearing, such as between 20 Hz and 20,000 Hz.

Once the user profile(s) 50 are established, the user may bring the user device 18 into proximity of the shareable device 14 (e.g., within UWB range) to establish communication between the user device 18 and the shareable device 14. Then, the user device 18 may provide the user ID 40 to the shareable device 14, which may then relay the user ID 40 to the server 22. The user identifier may enable identification of the user profile 50 in the one or more databases 23. The server 22 pairs the shareable device 14 with the user profile 50 and also provides a pairing indication that generally modified operation of the shareable device 14. For example, the pairing indication may cause the shareable device 14 to provide feedback (e.g., visual feedback, audio feedback, or tactile feedback) to notify the user that the shareable device 14 has been paired to the user. For example, the user profile 50 may include or be at least temporarily associated with a color scheme (e.g., blue), and the feedback devices 29 on the shareable device 14 may illuminate in a color (e.g., blue) that corresponds to the color scheme. It should be appreciated that the server 22 may provide the output that includes the user profile 50 and/or instructions to control the shareable device 14 in a particular way (e.g., to turn on the feedback devices 29 with the color) to cause the shareable device 14 to provide the pair output.

Upon the user bringing the user device 18 into proximity of an additional shareable device (e.g., the shareable device 14B) (e.g., within UWB range) to establish communication between the user device 18 and the additional shareable device 14B, the user device 18 may provide the user ID 40 to the additional shareable device 14B. Then, the additional shareable device 14B may relay the user ID 40 and the shareable device ID 30 of the additional shareable device 14B to the server 22 to enable identification of the additional user profile 50 in the one or more databases 23 and association of the additional user profile 50 with the additional shareable device 14B. The server 22 may provide an additional output that causes the additional shareable device 14B to provide an additional pairing indication to notify the additional user that the additional shareable device 14*b* has been paired to the additional user. For example, the additional user profile may include or be at least temporarily associated with a different color scheme (e.g., purple), and the feedback devices 29 on the shareable device 14 may illuminate in a color (e.g., purple) that corresponds to the color scheme. The server 22 may provide the output that includes the additional user profile 50 and/or instructions to control the shareable device 14 in a particular way (e.g., to turn on the feedback devices 29 with the different color) to cause the shareable device 14 to provide the pairing indication. The color schemes for the user profiles 50 may be known to the users and/or may be reflected by the user device 18, such as via a color indicator presented via the user device 18 that matches a color of the pairing indication.

In this way, the interactive system 10 may enable a single user device 18 to efficiently pair multiple different user profiles 50 to multiple shareable devices 14 (e.g., the user profile 50 to the shareable device 14*a*, the additional user profile 50 to the additional shareable device 14*b*, and so on) to support a high throughput of users as they collect the shareable devices 14*a*, 14*b*. The pairing process may be an automatic and/or iterative process based on the server 22 identifying and receiving the user ID 40 from the user device 18, receiving the shareable device ID from the shareable device 14, accessing the user profile 50 associated with the user device 18, and pairing the user profile 50 with the shareable device 14. Then, in response to the same user device 18 being brought into proximity of the additional shareable device 14*b*, the server 22 recognizes the user ID 40 from the user device 18, receives the shareable ID 30 of the shareable device 14*b*, recognizes that the user profile has already been paired to the shareable device 14*a* (and thus, disregards or skips over the user profile), accesses the additional user profile 50 associated with the user device 18, and pairs an additional user profile 50 of the user (e.g., a profile corresponding to a guest, a friend, a child, a family member) with the shareable device 14*b*, and so on.

The pairing indication may also assist multiple users to differentiate their shareable devices 14*a*, 14*b*, 14*c*, and 14*d*, even if each user has their own user device 18. For example, a first user (e.g., positioned in a queue) may position their user device 18 proximate to (e.g., within UWB range of) the first shareable device 14*a*, which may then illuminate, after being paired to their user profile 50 by the server 22, in a first color that operates to visually confirm to the first user that the first shareable device 14*a* has been paired to their user profile 50. Concurrently, simultaneously, or soon after, a second user in the line may hold their user device 18 against the second shareable device 14*b*, which may then illuminate in a second color (e.g., different than the first color) that operates to visually confirm to the second user that the second shareable device 14*b* has been paired to their user profile 50 (e.g., a second user profile 50 associated with an account of the user). Similarly, a user that has set up multiple user profiles 50 may select a particular user profile 50 for one pass through the interactive environment 10 and hold the user device 18 against the third shareable device 14*c*, which may then illuminate in a third color that operates to visually confirm to the user that the third shareable device 14*c* has been paired to the particular user profile (e.g., a third user profile associated with an account of the user). It should be noted that the above discussion may be used to pair any of all of the shareable devices 14*a*, 14*b*, 14*c*, and 14*d* to a user.

The shareable device 14, the server 22, the one or more databases 23, and/or the user device 18 may communicate via any suitable communication techniques (e.g., communication protocols) to perform the various embodiments disclosed herein. As described herein, the user device 18 and the shareable device 14 may communicate via a first type of communication (e.g., first type of communication protocol, such as NFC, RFID, UWB, Wi-Fi, and the like) and the shareable device 14 and the server 22 may communicate via second type of communication (e.g., a second type of communication protocol, such as NFC, RFID, UWB, Wi-Fi, and the like). Thus, the user device 18 may provide the user ID 40 to the shareable device 14 using the first type of communication protocol. Subsequently the shareable device 14 provides the shareable device ID 30 and the user ID 40 to the server using the second type of communication protocol. To facilitate discussion, the user device 18 and the server 22 may both be referred to herein as "external devices or systems" to indicate that certain processing steps may be carried out by these external devices or systems that are separate (e.g., physically separate) from the shareable device 14*a*. In an embodiment, the shareable device 14, the server 22, the one or more databases 23, and/or the user device 18 may communicate via the same communication protocols. However, since the user device 18 may only need to communicate a relatively small amount of data to pair the shareable device 14 to a user profile 50, the likelihood of pairing being delayed or interrupted due to an unstable connection between the user device 18 and the shareable device 14 is decreased.

In an embodiment, the shareable device 14 may temporarily store the user ID 40 and/or the shareable device 14 may use the user ID 40 to access and/or to download the user profile 50 for the user. For example, the shareable device 14 may access and/or download the user profile 50 for the user by using the communication circuitry 28 (e.g., UWB circuitry) to communicate with the server 22, which may access the user profile 50 from the one or more databases 23 and provide the user profile 50 to the shareable device 14.

The user profile 50 for the user may include a stored log of achievements and/or data that is unique (or at least tailored) to the user. The user profile 50 may depend on previous visits to and/or experiences in the interactive environment 10. The user profile 50 may include data, such as a number of visits, a number of points accumulated during one or more visits, an average number of points accumulated per visit, a total number of points accumulated across all visits, which shareable device 14 and/or the user ID 40 of the user previously used, interactive elements that the user was able to successfully target (e.g., strike) with one or more shareable devices 14 during one or more visits, a percent accuracy (e.g., strikes/attempts) during one or more visits, a time to travel through the interactive environment 10 during one or more visits, a current level achieved in the interactive environment 10, a highest level achieved in the interactive environment 10, a type of the user device 18 carried by the user, a history of purchases made by the user, a history of other interactive environments 10 visited by the user, a history of amusement park attractions visited by the user, a history of projectiles used during one or more visits, and/or any of a variety of other information related to a performance and/or an experience related to the interactive environment 10. The user profile 50 may also include characteristics of the user, such as an age of the user, a height of the user, a weight of the user, a capability of the user, whether the user is associated with any special circumstances (e.g., such that certain physical, mental, or emotional accommodations may be necessary or provided), and so on. The user profile 50 may also include preferences of the user, such as preferred virtual projectiles (e.g., characteristics or attributes, such as colors, sizes, and/or types) and/or preferred feedback to be present via the shareable device 14. At least in some instances, the preferences of the user may be entered and/or selected via the user device 18. The user profile 50 may be referenced to provide the user-specific special effects within the interactive environment 10, and/or the user profile 50 may be updated during each visit to the interactive environment 10. Alternatively, some or all elements of the user profile 50 may be transferred to and temporarily downloaded onto (e.g., stored on) the shareable device 14.

In an embodiment, the user ID 40 may include certain transactional data. For example, it may be advantageous to implement the shareable device system 12 to operate using transactional data, such as financial tokens, microtransactions, mobile payments, digital wallets, and so on. For example, the user device 18 may execute an application (e.g., a third-party application) that enables a user to purchase certain profile settings (e.g., blaster effects, visual feedback patterns, audio settings, and the like) and/or acquire or obtain the shareable device 14. That is, the application may generate a ticket linked to the user ID 40. As such, the shareable device 14 may receive the user ID 40 that includes the ticket and transmit the user ID 40 and the ticket to the server 22. The server 22, after receiving the ticket, may transmit a transaction feedback to the user 16, which generally enables the user to select one or more profile settings. For example, the transaction feedback may cause the display of the user device 18 to display one or more purchasable profile settings associated with the interactive environment 10. In this way, the shareable device system 12 may improve the immersion of the user 16 while enabling the user to further personalize their experience within the interactive environment 10. While the user may pay a monetary value to obtain the shareable device 14 and/or the addition profile settings, in some embodiments, the monetary value may be set to zero, so that the transactional data may be used to implement the shareable device system 12 without paying a monetary value.

Figure 4:
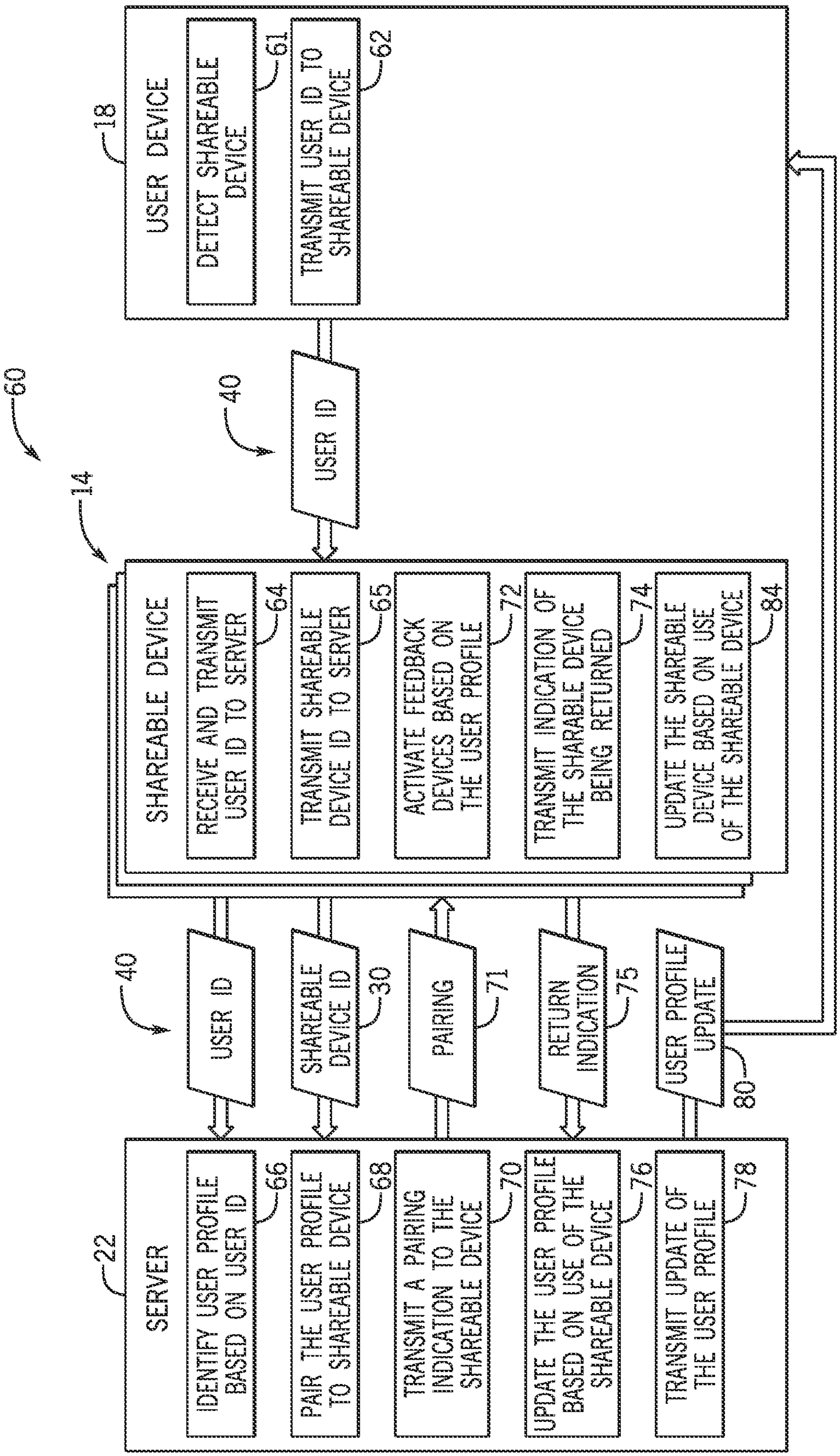
FIG. 4 is a data flow diagram illustrating communication between a user device, a shareable device, and a server that may performed in the shareable device systems of FIGS. 1 and 2, in accordance with an aspect of the present disclosure.

To further illustrate the techniques disclosed herein, FIG. 4 is a data flow diagram illustrating a method 60 for pairing a shareable device 14 to a user profile 50 that is stored on a server 22. In general, certain process blocks performed in the method 60 may be performed by the processor 24 of the shareable device 14, the processor 34 of the user device 18, or the processor 44 of the server 22. However, for simplicity, the actions described below are being described with respect to the shareable device 14 rather than the processor 24, the user device 18 rather than the processor 34, and the server 22 rather than the processor 44. Moreover, certain process blocks described below may be performed in a different order than that illustrated, and, indeed, in some embodiments, certain process blocks may be skipped altogether.

As shown in the illustrated embodiment, in process block 61, the user device 18 detects the shareable device. For example, as described herein, the user 16 may bring a user device 18 into proximity of the shareable device (e.g., within UWB range, such as within three centimeters (cm) or less, four cm or less, five cm or less, ten cm or less, and so on) to establish communication between the user device 18 and one or more of the shareable devices 14.

In response to detecting the shareable device 14, in process block 62, the user device 18 transmits a user ID 40 to the shareable device to initiate pairing of a user profile 50 associated with the user ID 40 to the shareable device 14. Subsequent to receiving the user ID 40, the shareable device 14 transmits, in process block 64, the user ID 40. Additionally, the shareable device 14 transmits, in process block 65, a shareable device ID 30 corresponding to the shareable device 14 to the server 22. In turn, the server 22 identifies a user profile 50 based on the user ID 40. In particular, in process block 66, the server 22 identifies and retrieves a user profile 50 stored in a database 23 that corresponds to the user ID 40. In an embodiment, the server 22 may perform an iterative process to identify the user profile 50 corresponding to the user ID 40.

In process block 68, the server 22 pairs the user profile 50 to the shareable device 14 corresponding to the received shareable device ID 30. In general, the server 22 pairing the user profile 50 to the shareable device 14 may include the server 22 updating interactions between the shareable device 14 and an interactive environment 10 or the vehicle rental environment 20, or outside of the interactive environment 10 or the vehicle rental environment 20, to the user profile 50.

In process block 70, the server 22 transmits a pairing indication 71 to the shareable device 14. In general, the pairing indication 71 may provide feedback to a user of the successful pairing between the shareable device 14 and the user device 18. In turn, the shareable device 14, in process block 72, may activate one or more feedback devices 29 based on the pairing indication 71. In general, the pairing indication 71 may cause a feedback device 29 of the shareable device 14 to activate, thereby confirming the successful pairing. In additional or alternative embodiments, the pairing indication 71 may cause feedback (e.g., using the feedback device 29) based on an unsuccessful pairing (e.g., a 'red light', a different haptic, an error sound, a displayed 'X', displaying a failure message, and the like). In an embodiment, the type of feedback provided by the feedback device 29 may be based on preferred settings indicating by a user profile. Accordingly, in such embodiments, the pairing indication 71 may include certain user profile settings (e.g., the settings 52 of the user profile 50).

In process block 74, the shareable device 14 transmits a return indication 75 of the shareable device 14 being returned. For example, the shareable device 14 may determine a time period during which the shareable device 14 is idle exceeds a threshold. Accordingly, the shareable device 14 may determine that the shareable device 14 is no longer in use and transmit the return indication 75. In an embodiment, the return indication 75 may include data of one or more interactions between the user, the shareable device 14, and the interaction environment 10.

In process block 76, the server 22 updates the user profile 50 based on the return indication. That is, the server 22 may update the user profile 50 based on use of the shareable device 14. Accordingly, the server 22 may update the user profile 50 and/or databases 23 to include data indicating achievements, updated user preferences, interactions between the user and the shareable device 14, and the like. In embodiments where multiple user profiles 50 are associated with a single user ID, a first shareable device 14 may be paired with a first user profile 50 (e.g., associated with the user ID 40) and a second shareable device 14 may be paired with a second user profile 50 (e.g., associated with the user ID 40). As such, the server 22 may update either user profile 50 (e.g., the first user profile, the second user profile, or both), based on data indicating achievements, updated user preferences, interactions between the user and the shareable device 14, and the like. In this way, users or guests may share achievements.

As illustrated, the server 22 may transmit a user profile update 80 of the user profile to the user device 18. In general, the server 22 may transmit the user profile update 80 after server 22 receives the return indication 75, the server 22 determines an update has been made to the user profile 50 (e.g., the server 22 receives a user profile update from the user device 18), and/or the server 22 determines a user has achieved or unlocked an achievement associated with the interaction environment 10 and/or vehicle rental environment 20. In turn, the user device 18 may update the shareable device based on use of the shareable device, in process block 84. For example, a display of the user device 18 may provide feedback to the user (e.g., "achievement unlocked," "a new high score," or "level-up"). As another non-limiting example, updating the user profile may include the processor 44 determining that a time period allotted for renting a car is near an end (e.g., within a threshold) or past the time period. As such the user profile update 80 may cause a display of the user device 18 to indicate that a time period corresponding to the rental of the car is approaching the end or has ended.

As described herein, the interactive system 10 may perform an iterative process to pair the shareable device 14 to the user, such as when a user (e.g., a parent) may desire to use a single user device 18 to pair multiple shareable devices 14 to multiple user profiles 50 (e.g., to children or other family members or guests of the parent). FIG. 5 is a flow chart of a method 90 to enable a user to adjust operation of the shareable device 14 using information stored on server 22. In some embodiments, the method may be implemented by executing instructions stored in a tangible, non-transitory, computer-readable medium, such as the memory 46, using the processor 44. For example, the method 90 may be performed at least in part by one or more software components, such as an operating system of the server 22, one or more software applications of the server 22, firmware of the server 22, and the like. While the method 90 is described using steps in a specific sequence, it should be understood that the present disclosure contemplates that the described steps may be performed in different sequences than the sequence illustrated, and certain described steps may be skipped or not performed altogether.

In process block 92, the processor 44 receives a user ID 40 and a shareable device ID 30 from a first shareable device 14. In particular, the processor 24 may receive a user ID 40 that includes data indicating a user profile 50 (e.g., accessible by the server 22). In process block 94, the processor 44 determines whether the user ID 40 is assigned to a second shareable device 14 (e.g., a shareable device different from the first shareable device 14). In general, and as discussed herein, a user ID 40 may be associated with multiple user profiles 50 (e.g., a first user profile and a second user profile). Accordingly, if the processor 44 determines that the user ID 40 is not assigned to the second shareable device 14, the processor 44 proceeds to block 96 to retrieve a first user profile 50 of the user ID 40 to the first shareable device 14. In process block 98, the processor 44 pairs the first user profile 50 with the first shareable device 14. However, if the processor 44 determines that user ID 40 is assigned to the second shareable device 14, then the processor 44 proceeds to block 100 to pair a second user profile 50 associated with the user ID 40 to the first shareable device 14. Accordingly, the processor 44, in processor block 102, may pair the second user profile 50 with the first shareable device 14.

In this way, the method 90 may be used to determine a user profile 50 to pair with a shareable device 14. As such, a user that desires to pair multiple shareable devices 14 with different user profiles 50 may do so using a single user device 18. It is presently recognized that such techniques may be advantageous when a user enters the interactive environment 10 with an additional user that does not have a user device 18 and/or does not have a user profile 50.

In one embodiment, the system 12 may use a Quick Response (QR) code. For example, a shareable device 14 may display a QR code that identifies the shareable device ID 30. In this embodiment, a camera of the user device 18 may take an image or scan the QR code, and the user device 18 may transmit the QR code indicating the shareable device ID 30 to the server 22. Accordingly, the server 22 may pair the user profile 50 associated with the user device 18 to the shareable device 14.

Figure 6:
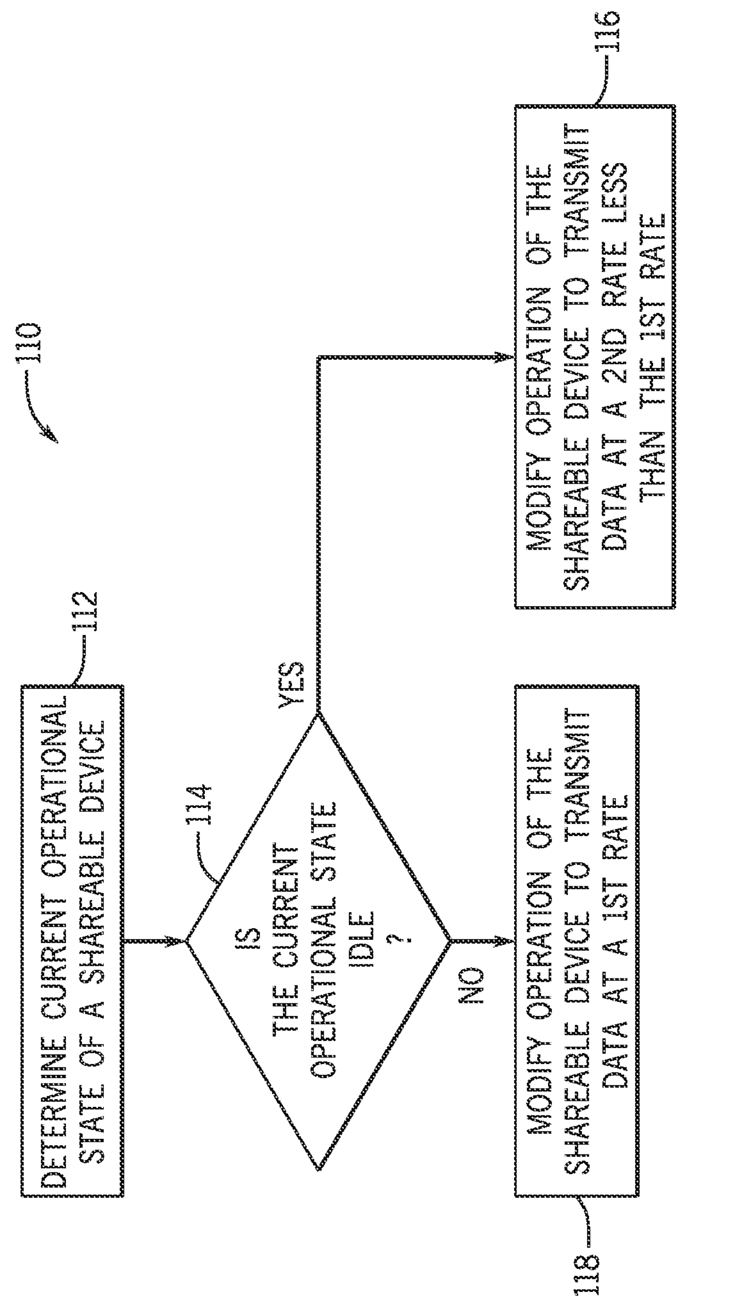
FIG. 6 is a flow diagram of a method for modifying amount of data transmitted by a shareable device, in accordance with an aspect of the present disclosure.

As described herein, the server 22 may receive data indicating interactions between a user using the shareable device 14. It is presently recognized that it may be advantageous to modify a rate of data transmitted by the shareable device 14 (e.g., and thus reduce the amount of data received by the server 22) based on an operational state of the shareable device 14. For example, it may be desirable to transmit less data from the shareable device 14 when the shareable device 14 is in an idle state (e.g., corresponding to an operational state where the shareable device 14 is not currently paired, is not in use for a time period exceeding a time threshold, or the shareable device 14 has not received a user ID 40) as compared to an operating, activating, or "in-use" state (e.g., corresponding to the shareable device 14 being in use or paired with a user profile 50). FIG. 6 is a flow chart of a method 110 to enable adjustment a rate of data transmitted by a shareable device 14. In some embodiments, the method 110 may be implemented by executing instructions stored in a tangible, non-transitory, computer-readable medium, such as the memory 46, using the processor 44. For example, the method 110 may be performed at least in part by one or more software components, such as an operating system of the server 22, one or more software applications of the server 22, firmware of the server 22, and the like. While the method 110 is described using steps in a specific sequence, it should be understood that the present disclosure contemplates that the described steps may be performed in different sequences than the sequence illustrated, and certain described steps may be skipped or not performed altogether.

In process block 112, the processor 44 receives an indication of a current operational state of the shareable device 14. In some embodiments, the indication may include a current location of the shareable device 14, such as whether the shareable device 14 is currently in a location of the interactive environment 10 corresponding to where the user 16 actively uses the shareable device 14 (e.g., in a gaming or playing area). In some embodiments, the indication may include data indicating whether the shareable device 14 is paired. For example, the processor 44 may query the database 23 and receive an output indicating the shareable devices 14 that are currently paired to a user profile 50. In some embodiments, the indication may include whether a return indication 75 associated with the shareable device 14 has been received by the processor 44 within a time range (e.g., 10 seconds or less, 30 seconds or less, one minute or less, two minutes or less, three minutes or less, five minutes or less, more than five minutes, and so on). In some embodiments, the processor 44 may receive in the indication in response to a trigger condition corresponding to the start of an event within the interactive environment occurring.

At block 114, the processor 44 determines whether the shareable device 14 is idle. In general, the processor 44 may determine whether the shareable device 14 is idle based on the indication. In some embodiments, if the indication indicates that the shareable device 14 is not in the playing area, then the processor 44 may determine that the shareable device 14 is idle. Similarly, if the processor 44 determines that the shareable device 14 is disposed in a checkout area or storage rack for pairing (e.g., but has not been paired), then the processor 44 may determine that the shareable device 14 is idle. As another example, if the indication indicates that the shareable device 14 is currently paired, then the processor 44 may determine that the shareable device 14 is not idle.

If the processor 44 determines that the shareable device 14 is not idle (i.e., in the "idle" state) or is in use (i.e., not in the "in-use" state), the processor 44 proceeds to block 118 to modify the operation of the shareable device 14 by causing the communication circuitry 28 of the shareable device 14 to transmit data at a first rate. However, if the processor 44 determines that the shareable device 14 is idle or is not in use, then the processor 44 proceeds to block 116 to modify the operation of the shareable device 14 by causing the communication circuitry 28 of the shareable device 14 to transmit data at a second rate. In general, the second rate may be less than the first rate. That is, it is presently recognized that it may be advantageous to cause the shareable device 14 to transmit data (e.g., data indicating of interactions within the interactive environment 10) at a relatively higher rate when the shareable device 14 is in use. In this way, the method 110 may be used to modifying the operation of one or more shareable devices 14 and to decrease the amount of data transmitted by the shareable devices 14 when it may be less desirable to transmit data.

It should be noted that while only two operational states (e.g., the "idle" state and the "in-use" state) are described above, any number of states may be used for modifying the frequency of data transmission by the shareable device 14. For example, the process 110 may be utilized to determine whether a shareable device 14 is in a playing area (e.g., the shareable device 14 is within the interactive environment 10 or on a storage rack associated with the interactive environment 10) or outside of the playing area (e.g., a user may have walked out of the interactive environment 10). As such, the indication may generally have similar features as described above with respect to 112 and/or whether the shareable device 14 is disposed on the storage rack. Accordingly, at block 114, the processor 44 may determine whether the current operational states indicate that the shareable device 14 is in the playing area. If the processor 44 determines that the current operational state is outside of the playing area, the processor 44 may modify the operation of the shareable device 14 by causing the communication circuitry 28 of the shareable device 14 to transmit data at a first rate, which may aid staff in finding the shareable device 14 that is outside of the playing area.

In some embodiments, the processor 44 may compare the current operational state to a previous operational state to determine whether the shareable device 14 is idle. That is, it may be advantageous to determine whether the shareable device 14 was recently in the "idle' state as compared to being in the "idle" state for a time period exceeding a time threshold (e.g., one hour, two hours, three hours, four hours). For example, the database 23 may also store a data indicating the previously determine operational state of the shareable device 14 and a time stamp. As such, the shareable device 14 may determine whether the shareable device 14 was previously placed in the "idle" state (e.g., the current operational state and the pervious operational state are the both the "idle" state), and thus, the processor 44 may not modify the rate of data transmitted by the shareable device 14. Alternatively, the shareable device 14 may determine that the shareable device 14 was recently played in the "idle" state (e.g., the current operational state is the "idle" state and the previous operational state is the "in-use" state), and the processor 44 may modify the rate of data transmitted as described above. It should be noted that referenced to "idle" and "in-use" may be exchanged in instances whether the processor 44, at block 114, may determine whether the shareable device 14 is in the "in-use" state.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive system, comprising:
- a server coupled to one or more databases storing a user profile;
- a shareable device configured to interact with an interactive environment, the shareable device comprising one or more processors, one or more memory devices storing a shareable device identifier, one or more feedback devices, and communication circuitry, wherein the shareable device is communicatively coupled to the server, and wherein the one or more processors are configured to:
  - receive a user identifier from a user device via the communication circuitry;
  - transmit the user identifier to the server via the communication circuitry;
  - transmit the shareable device identifier to the server via the communication circuitry;
  - receive a pairing indication from the server via the communication circuitry based on the user identifier and the shareable device identifier;
  - activate the one or more feedback devices based on the pairing indication;
  - transmit data from the shareable device to the server at a first rate based on the pairing indication;
  - subsequent to activating the one or more feedback devices and transmitting data from the shareable device to the server at the first rate, determine that the shareable device is in an idle state;
  - modify the first rate to a second rate different from the first rate based on the determination that the shareable device is in the idle state; and
  - transmit a return indication to the server via the communication circuitry based on the determination that the shareable device is in the idle state.

2. The interactive system of claim 1, wherein the communication circuitry comprises ultra-wideband (UWB) communication circuitry.

3. The interactive system of claim 1, wherein the one or more processors are configured to transmit the shareable device identifier to the server via the communication circuitry subsequent to receiving the user identifier.

4. The interactive system of claim 1, wherein the one or more processors are configured to transmit data indicative of interactions performed with the shareable device to the server via the communication circuitry.

5. The interactive system of claim 1, wherein the shareable device comprises a portable device, and wherein the interactive environment is an attraction of an amusement park.

6. The interactive system of claim 1, wherein the communication circuitry comprises Wi-Fi communication circuitry.

7. The interactive system of claim 1, wherein the shareable device comprises a vehicle.

8. The interactive system of claim 7, wherein the one or more feedback devices comprise a display of the vehicle.

9. The interactive system of claim 1, comprising the user device, and wherein the user device comprises a portable user device.

10. The interactive system of claim 1, wherein the one or more processors are configured to transmit the shareable device ID to the server via a first frequency range, and wherein the one or more processors are configured to receive the user identifier via a second frequency range that is different from the first frequency range.

11. A method, comprising:
- receiving, using communication circuitry, a user identifier (ID) associated with a user device from a shareable device, wherein the shareable device is an interactive tool used in an interactive environment;
- receiving, using the communication circuitry, a shareable device ID from the shareable device;
- determining, using one or more processors, a user profile to pair with the shareable device based on the user ID;
- pairing, using the one or more processors, the user profile with the shareable device based on the shareable ID;
- receiving, using the communication circuity, a transmission of data from the shareable device at a first rate subsequent to pairing the user profile with the shareable device;
- subsequent to pairing the user profile with the shareable device and receiving the transmission of data from the shareable device at the first rate, determining that the shareable device is in an idle state;
- modify the first rate to a second rate different from the first rate based on the determination that the shareable device is in the idle state; and
- receiving a return indication via the communication circuitry based on the determination that the shareable device is in the idle state.

12. The method of claim 11, comprising transmitting, using the communication circuitry, a pairing indication to the shareable device based on the user profile pairing with the shareable device.

13. The method of claim 12, wherein one or more feedback devices of the shareable device are configured to activate based on the pairing indication.

14. The method of claim 11, wherein determining, using the one or more processors, the user profile to pair with the shareable device comprises:

determining, using the one or more processors, that an additional user profile is paired with an additional shareable device; and determining, using the one or more processors, to pair the user profile with the shareable device in response to determining that the additional user profile is paired with the additional shareable device.

15. The method of claim 11, comprising:

receiving, using the communication circuitry, a first portion of the data indicating interactions between the shareable device and the interactive environment; and updating, using the one or more processors, the user profile based on the received first portion of the data indicating interactions between the shareable device and the interactive environment.

16. The method of claim 15, comprising transmitting, using the communication circuitry, additional data indicating the user profile, as updated, to the user device.

17. The interactive system of claim 1, wherein the server is configured to update the user profile in response to receiving the return indication.

* * * * *